United States Patent Office 2,796,968
Patented June 25, 1957

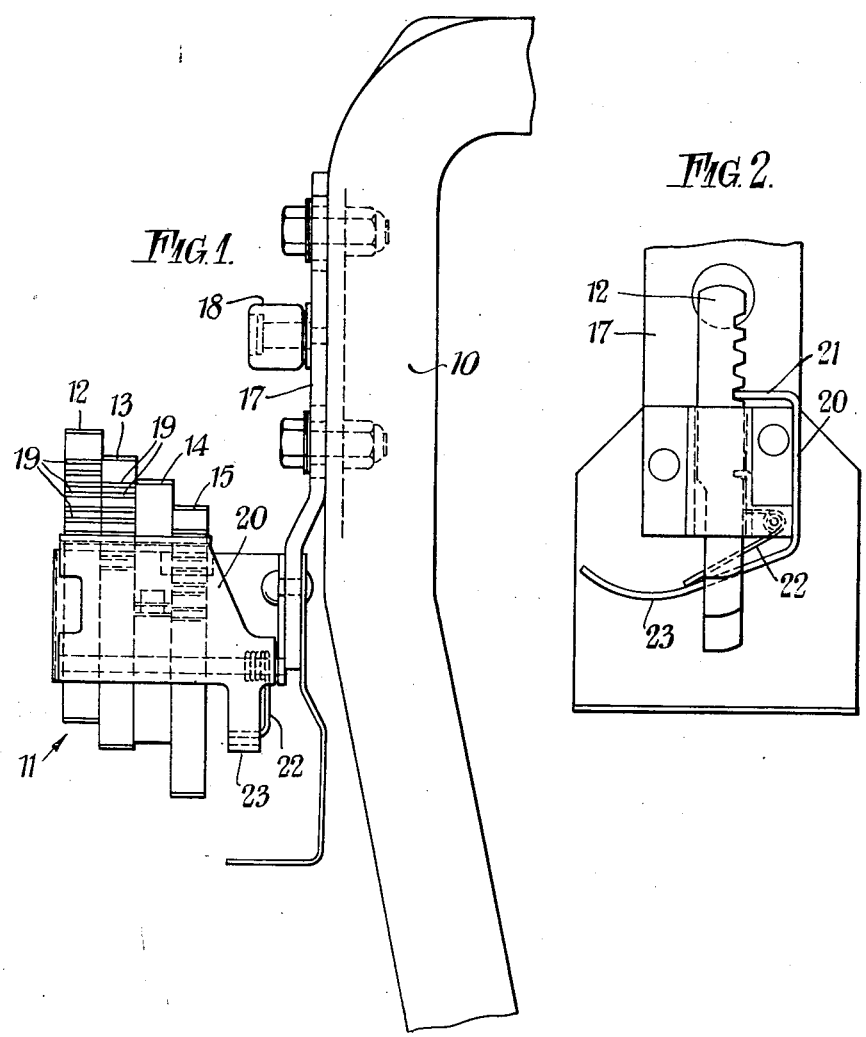

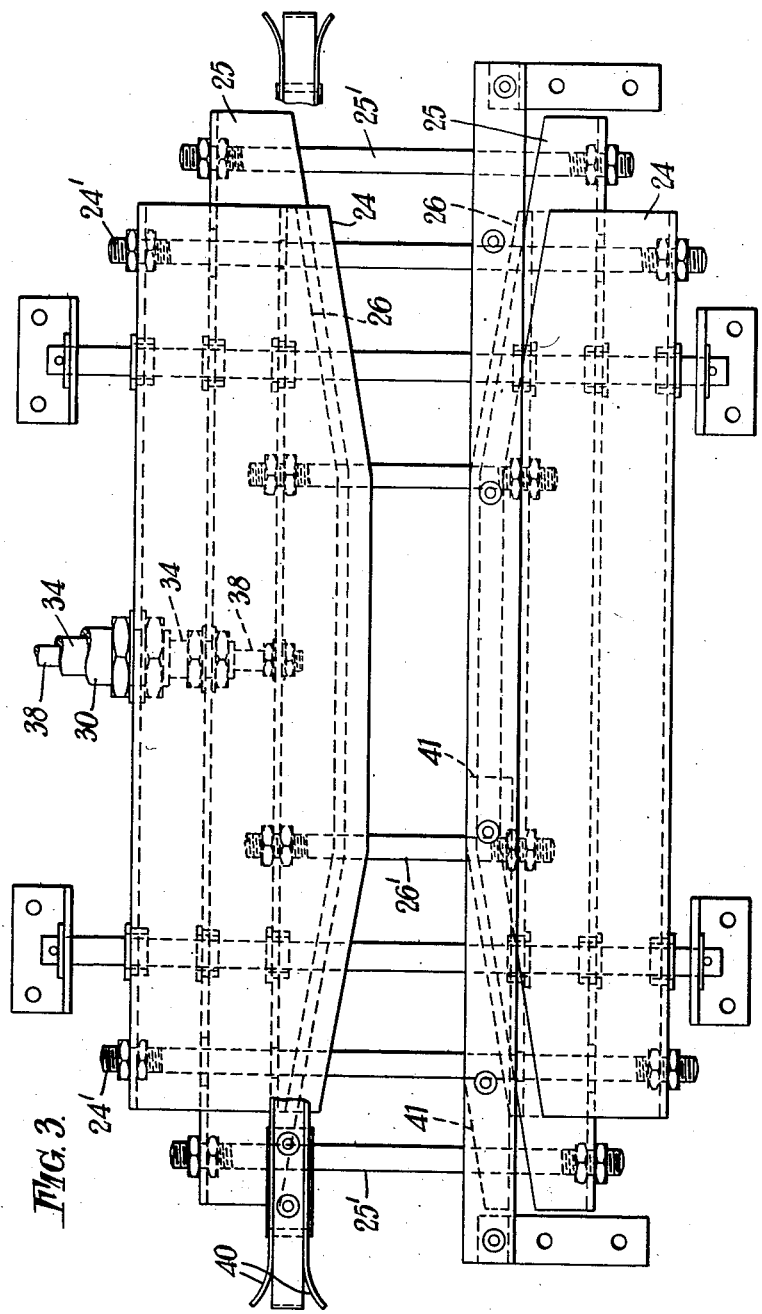

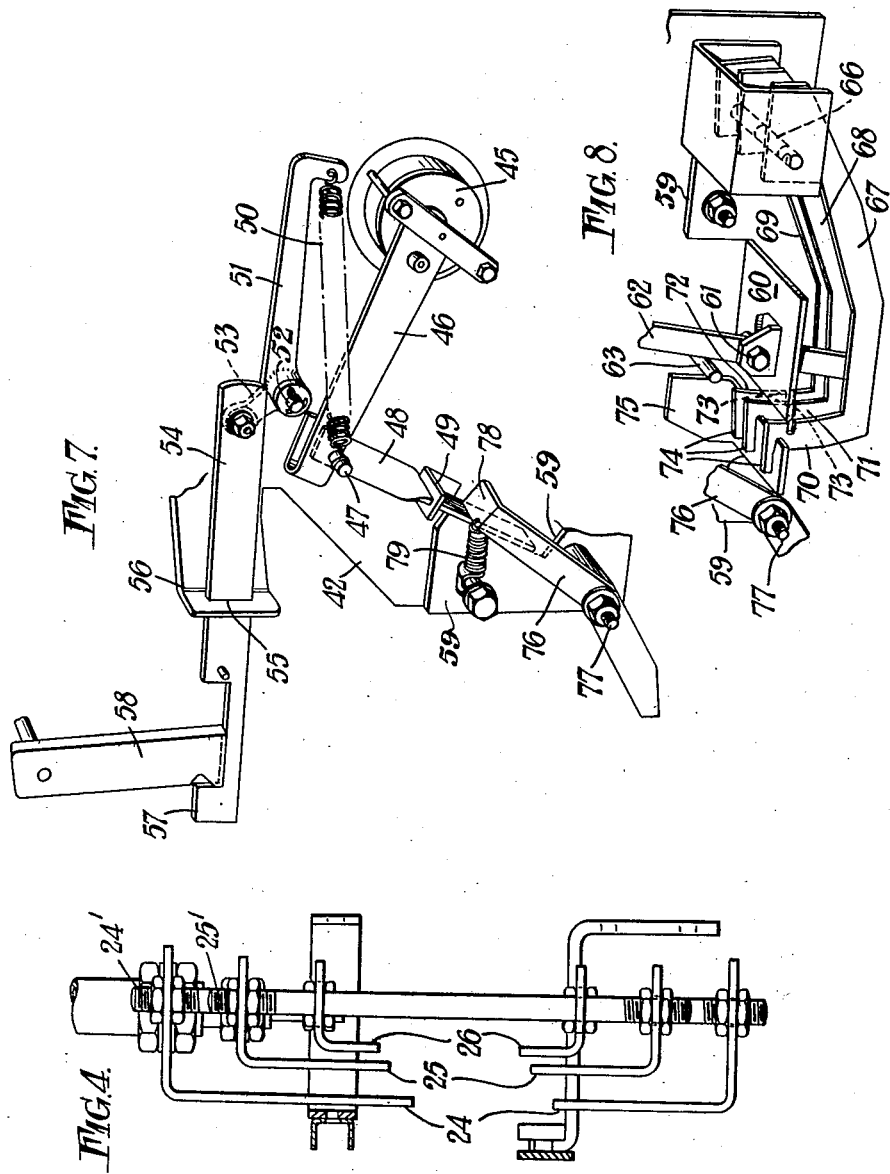

2,796,968

CONVEYOR SYSTEMS

Arthur Thomas Charles Burrows, Stevenage, England, assignor to Geo. W. King, Limited, Stevenage, England, a British company Application December 1, 1954, Serial No. 472,399

Claims priority, application Great Britain December 3, 1953

8 Claims. (Cl. 198—38)

This invention relates to conveyor systems and has for its chief object to evolve means whereby auxiliary mechanisms associated with a main conveyor may be selectively caused to operate automatically by adjustable means associated with each load carrier.

According to the present invention there is provided in a conveyor system a trip mechanism adapted to control the operation of a fluid control valve or other device in turn serving to operate or control an auxiliary mechanism, such trip mechanism comprising a plunger element operatively connected to the valve or other device and normally retained in an inoperative position by a latch plate or the like the movement of which latter, to effect release of the plunger element and consequent operation of the valve or other device, is controlled by movable finger or like elements adapted to be actuated by selector means associated with a load carrier travelling along the conveyor.

In accordance with a further aspect of the invention a selector device is provided which is adapted to be applied to any load carrier such device comprising a plurality of individually adjustable plunger elements and means adapted to lock said elements in any position in which they may be set. If desired means may be provided for effecting setting of the plunger elements such means comprising a plurality of individual setting devices so disposed along the conveyor path that on movement of a load carrier having a selector device associated therewith each plunger element of such device will co-operate with one of said setting devices and means adapted to effect a preselected movement of each of the setting devices independently of the others thereby to effect appropriate setting of the individual plunger elements.

In accordance with yet a further aspect of the invention a conveyor system includes an adjustable selector or like device associated with each load carrier in adjustable relationship thereto and trip mechanisms with which said selector devices are adapted to co-operate and which are disposed at spaced points along the conveyor path the arrangement being such that each trip mechanism will be operated only by a selector device having a particular setting imparted thereto.

In order that the said invention may be clearly understood and readily carried into effect the same will be hereinafter more fully described with reference to the accompanying drawings in which:

Fig. 1 is a front elevational view showing a part of a load carrier to which an adjustable selector device comprising a plurality of plunger elements is attached.

Fig. 2 is a side elevational view looking from the left of Fig. 1.

Fig. 3 is a side elevational view of a mechanism for setting the plunger elements of the selector device.

Fig. 4 is an end view of the mechanism shown in Fig. 3.

Figs. 7 and 8 are detail views showing parts of the mechanism illustrated in Fig. 6.

Figure 5:
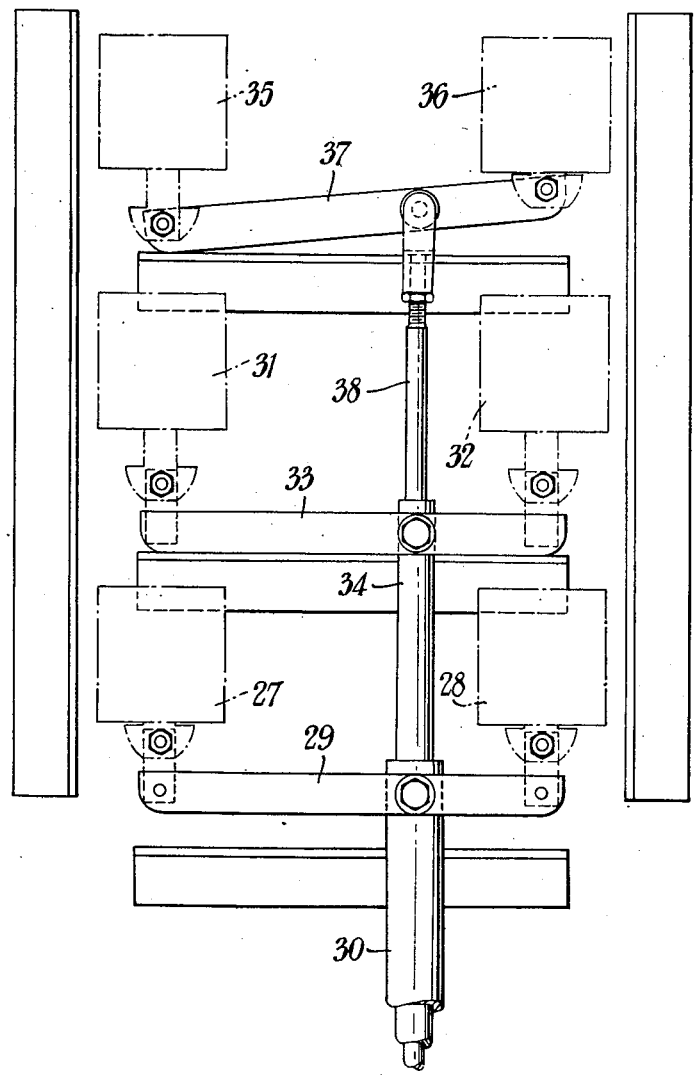
Fig. 5 is a side elevational view illustrating a mechanism employed for effecting the operation of the setting mechanism illustrated in Figs. 3 and 4.

In the following description it will be assumed that the selector mechanism is to be employed in a conveyor system which comprises a main conveyor and one or more subsidiary or branch conveyors such conveyors each including an endless driven chain adapted to run in a fixed overhead track of substantially box like section. The chain which incorporates a plurality of rollers adapted to run on the inner surfaces of the track may also incorporate at its upper part a plurality of plate like elements which are adapted to provide the equivalent of a continuous travelling band or platform on which load carriers may be supported. In such systems it is common practice to incorporate auxiliary mechanisms such as a transfer unit of the kind described in the specification of our prior application Ser. No. 437,173 for effecting transfer of load carriers from the main to a subsidiary conveyor which at the point of transfer runs parallel to said main conveyor. While the selector mechanism of the present invention is adapted particularly for effecting the operation of such a transfer unit and will be described with reference to that particular application, it is, however, to be understood that its use is not necessarily so limited since it may be employed for selectively operating any auxiliary mechanism associated with a conveyor.

Referring now to the drawings 10 denotes the portion of a load carrier frame on which a selector device indicated generally at 11 is mounted. The selector device comprises four vertically disposed plunger elements 12, 13, 14 and 15 of which three are adjustable vertically while the fourth, designated 14 in Fig. 1, is fixedly mounted in position. The plunger elements are supported in a frame 16 which is attached to a bracket 17 the latter being so mounted on the carrier frame 10 as to be capable of limited vertical adjustment. Mounted on the bracket 17 is a freely rotatable roller 18 adapted to engage guides associated with a plunger setting mechanism and also with a trip mechanism to be hereinafter described, the arrangement being such as to ensure accurate vertical engagement between the selector device and such setting and trip mechanisms. As will be seen from Fig. 1 each of the plungers 12, 13 and 15 is formed with four transverse slots indicated at 19 which are so disposed as to face in the direction of travel of the conveyor. 20 denotes a pivoted latch member having an inwardly directed tongue 21 adapted to engage in the slots in said adjustable plunger elements thereby to lock them in any of the various relative positions in which they may be set. The latch member which is urged by a spring 22 into its operative position is formed with a cam like projection 23 adapted to engage a fixed ramp associated with the plunger setting mechanism.

The plunger setting mechanism which is illustrated in Figs. 3, 4 and 5, is arranged parallel to the conveyor path and in a position such that the selector device above described and associated with each load carrier may pass therethrough. As will be seen said setting mechanism comprises three sets of cams 24, 25, 26, each set comprising an upper and a lower member disposed in spaced parallel relationship. The spacing between the upper and lower members of each set will be such as to accommodate one of the plungers 12, 13 or 15 the arrangement as shown being such that the set 24 will co-operate with the plunger 15 while the sets 25 and 26 will co-operate with the plungers 13 and 12 respectively. As will be clearly seen from Fig. 3 the upper and lower members of each set of cams are tapered at their end portions to facilitate entry and exit of the plungers. The upper and lower members of each cam set are coupled together by means of pairs of rods 24', 25' and 26' respectively such rods being slidably supported for vertical movement and the arrangement being such that each cam set will be capable of vertical adjustment independently of the others. In the embodiment illustrated each cam set is capable of being set in any one of four vertical positions.

As will be seen from Fig. 5 adjustment of each set of cams may be effected by means of a pair of solenoids. Referring now to Fig. 5, 27 and 28 denote a pair of solenoids the operative elements of which are pivotally connected to a beam 29 to which a link 30 is also pivotally connected at a point situated at one third of the span from one end of the beam, the lower end of said link being connected to the set of cams designated 24. 31 and 32 denote a second pair of solenoids which are coupled by means of a beam 33 and link 34 to the set of cams 25. 35 and 36 denote a third pair of solenoids which are coupled by means of a beam 37 and link 38 to the set of cams 26. The solenoids of each pair i. e. 27 and 28, 31 and 32 and 35 and 36, each have a stroke equal to the pitch of the uppermost and lowermost slots in the plungers 15, 13 and 12 and it will be seen that if the solenoid furthermost from the link 30, 34 or 38 is actuated the link will rise one third of the solenoid stroke. If on the other hand the second solenoid of the pair is operated the link will rise two thirds of the solenoid stroke while if both solenoids are actuated at once the line will rise a distance equal to the whole solenoid stroke. Thus it will be appreciated that including the position when both solenoids are not energised each set of cams may be set to any one of four different positions and consequently the plungers of the selector device as they pass between the upper and lower members of the sets of cams. The plunger setting mechanism may conveniently be controlled from a push button control panel having four rows of three push buttons each button of the top row being numbered 1, each of the next row being numbered 2, each of the next row 3 and those of the lowermost row 4.

The arrangement may be such that when any button numbered 1 is pressed the two solenoids associated therewith will both be energised so that the associated set of cams will be set in the highest position. For any button numbered 2 the solenoid nearer to the link will be operated and the set of cams will be set in the next lower position. For any button numbered 3 the solenoid farther from the link will be operated and the set of cams will be set on the position next to the lowest. Finally for any button numbered 4 neither solenoid will be energised and the set of cams will remain in the lowermost position. The electrical circuit will be such that in any column of four buttons the pressing of any button in that column will cancel any previous setting and reset to the new requirements or there may be a clearing button which will cancel all settings on the control panel before resetting takes place.

From the foregoing it will be seen that the number of combinations available for the three adjustable plungers each having four possible settings is sixty-four and of course this applies to the setting mechanism.

The operation of the mechanism so far described will be as follows:

Assuming that a load carrier is approaching a plunger setting mechanism and that the adjustable plungers on the selector device are to be set in positions 2, 4, 3 the Figure 2 applying to the plunger farthest from the conveyor track i. e. in the embodiment illustrates the plunger 12. The push buttons numbered 2 in the first column, 4 in the second column and 3 in the third column will be pressed and as a result the set of cams 26 will be set to position 2, while the set of cams 25 will be set to the lowermost position and the cams 24 to position 3. As the load carrier approaches the setting mechanism the roller 18 on the selector device will engage a pair of guides 40 to locate the selector device in the correct relationship to the plunger setting mechanism and the plungers will commence to enter the converging portions of the sets of cams. At this point the cam like projection 23 on the latch member 20 will engage a fixed ramp 41 (Fig. 3) thus disengaging said latch member from the plungers which as they contact the respective cam sets will be adjusted progressively in height until they are located in the parallel throat portions between the upper and lower members of said cam sets. The fixed ramp 41 terminates at a suitable distance from the end of the parallel throat portions of the cam sets so that the latch member 20 will be returned by its spring 22 into its operative position wherein it will engage the appropriate slots 19 in the plungers and thus positively locate them in their set positions before they leave the parallel throat portions. The selector device is now prepared for releasing any trip mechanism disposed along the conveyor path and set to be operated by the combination 2, 4, 3.

Figure 6:
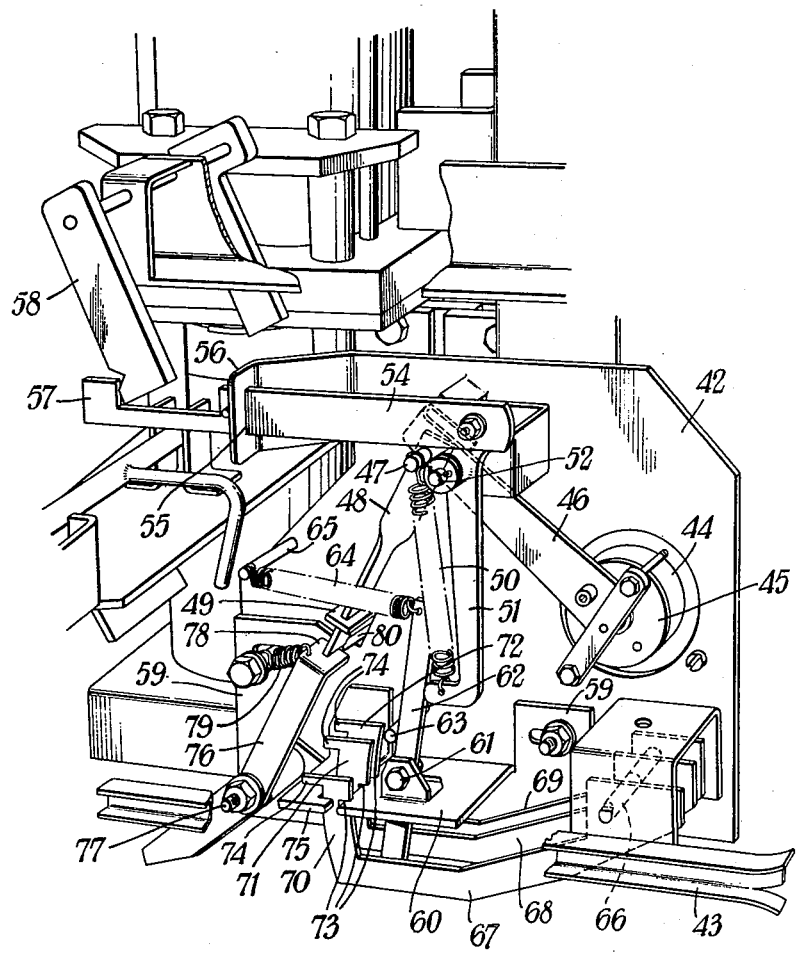
Fig. 6 is a perspective view illustrating a trip mechanism adapted to be actuated by a selector device such as is shown in Figs. 1 and 2.

Turning now to Figs. 6, 7 and 8 these illustrate a trip mechanism adapted to be actuated by a selector device of the kind described above. In this case the trip mechanism is adapted to control the operation of a valve for supplying compressed air required for effecting operation of a transfer mechanism of the kind described in the specification of our prior patent application Ser. No. 16,946/53.

Referring to Fig. 4, 42 denotes a panel for supporting the component parts including a guide channel 43 with which the roller 18 on the selector device is adapted to co-operate to ensure accurate positioning of said device with respect to the trip mechanism. 44 denotes the valve, the operation of which is to be controlled by the trip mechanism such valve having a movable disc member 45 to which one end of a lever 46 is attached. The lever 46 is pivotally connected at its other end by means of a pin 47 to a plunger member 48 the lower end of which slides in a fixed guide 49 attached to or formed integrally with the panel 42. Anchored to the pin 47 is one end of a tension spring 50 the other end of which is attached to a lever 51 which is capable of pivotal movement about a fixed pivot 52. The lever 51 is formed with a second arm or extension 53 to which a link 54 is pivotally connected, said link sliding in a slot 55 formed in an arm 56 which projects outwardly from and is attached to or formed integrally with the panel 42. At its free end the link carries an abutment 57 adapted to co-operate with an abutment member 58 attached to and rotatable with a part of the transfer mechanism hereinbefore referred to.

Located at the lower part of the panel 42 is a plate 59 the plane of said plate being disposed parallel to that of the panel. The plate 59 which is supported for limited horizontal sliding movement back and forth across the face of the panel, is formed with an outwardly directed shelf 60 which carries a bearing 61 adapted to support a lever 62. The lower part of the lever 62 projects below the shelf 60 and is adapted to be engaged by the fixed plunger element 14 on the selector device carried by any passing load carrier while the upper part of said lever is forced into contact with a rigid stop 63 by means of a tension spring 64 which is connected at one end to the upper end of said lever and at the other to an anchor 65 carried by the panel 42.

Pivotally mounted on a shaft 66 are three fingers 67, 68 and 69 which are formed at their outer or free ends with arcuate portions 70, 71 and 72 each having a slot 73 in the inner edge thereof and an outwardly directed abutment 74 at the outer edge. In the normal or inoperative position the fingers 67, 68 and 69 will assume a position such as is shown in Fig. 8 wherein the abutments 74 will abut and will be supported on a fixed plate 75 mounted on the panel 42. When however the fingers 67, 68 and 69 are operated by the appropriately set plungers of a selector device they will be lifted into a position as shown in Fig. 6 wherein the slots 73 will be disposed in alignment and will receive the edge of the shelf 60 on forward movement of the plate 59 as will be hereinafter more fully described.

76 denotes a release lever which is mounted for pivotal movement about a fixed pivot 77 carried by the panel 42. The lower end of the lever 76 which projects downwardly below the lower edge of the panel 42, is adapted to be contacted by the fixed plunger 14 on a selector device in a similar manner to the lower end of the lever 62. The lever 76 is formed at its upper part with an inturned portion 78 which is adapted to co-operate with an edge of the plate 59 being urged into contact therewith by means of a spring 79 attached to said lever.

When the trip mechanism is in its normal position the plunger 48 is held in contact with the upper edge of the plate 59, the movable disc 45 of the valve is held in one of two possible settings, the link 54 is in its fully retracted position and the lever 51 is set so that the spring 50 is to one side of its dead centre position. At this stage also the release lever 76 is held by the plate 59 which is in its fully retracted position as shown in Fig. 8 (i. e. moved to the right as compared with the position shown in Fig. 6). The plate 59 is retracted by virtue of the action of the spring 64 which turns the lever 62 about the abutment 63 and in the retracted position, as will be seen from Fig. 8 the edge of the shelf 60 will be withdrawn clear of the fingers 67, 68 and 69 which will be in their lowermost position.

Assuming that the slots 73 in the fingers 67, 68 and 69 are so disposed as to correspond to the setting of the plungers of the selector device (e. g. the setting 2, 4, 3 in the example hereinbefore described) then as the load carrier approaches the trip mechanism the plungers 15, 13 and 12 will contact said fingers and will raise them until the slots 73 are in line horizontally. As the carrier moves on, the fixed plunger 14 will contact the lower end of the lever 62 and will by virtue of the continued motion of said load carrier cause the plate 59 to move so that the edge of the shelf 60 will enter the slots 73 on the fingers 67, 68 and 69. Movement of the plate 59 releases the plunger 48 which then moves a short distance not substantially affecting the valve setting and comes to rest on the inturned portion 78 of the release lever 76. As further motion of the load carrier occurs the plunger 14 will pass out of contact with the lower end of the lever 62 but the plate 59 is prevented from returning to the retracted position by virtue of the fact that the plunger 48 is then in its path. Continual rotation of the load carrier brings the fixed plunger 14 of the selector device into contact and the lower end of the release lever 76 which is moved in a clockwise direction having reference to Fig. 6 so that the plunger 48 is no longer positively supported and is free to move downwardly into the position shown in Fig. 7 under the action of the spring 50. The downward movement of the plunger 48 results in angular movement of the lever 46 which effects changing of the valve setting.

As a result of actuation of the valve the operation of the transfer unit is initiated and after a predetermined period the abutment member 58 carried by a movable element of the transfer unit will co-operate with the abutment 57 on the link 54 thereby to move the latter in the direction of motion of the conveyor i. e. into the position shown in Fig. 7. The movement of the link 54 will result in angular movement of the lever 51 into the position shown in Fig. 7 with the result that the spring 50 will be moved to the other side of the axis of rotation of the valve thereby causing the lever 46 to be returned to its initial position as shown in Fig. 6 with consequent reversal of the valve. The return of the lever 46 will result in withdrawal of the plunger 48 from between the plate 59 and the release lever 76, both of which will assume their original settings as a result of the action of the spring 64 on the lever 62. The retractive movement of the plate 59 will cause the edge of the shelf 60 to be retracted from the slots 73 in the fingers 67, 68 and 69 whereupon said fingers will fall into their lowermost positions wherein the abutments 74 will rest on the plate 75. The transfer unit with which the trip mechanism is associated is such that consequent upon valve reversal the abutment 58 will be withdrawn from the abutment 57 on the link 54 so that the latter together with the lever 51 will be moved under the action of the spring 50 into their initial positions.

When a load carrier, having a selector device wherein the plungers 12, 13 and 15 have a different setting from that of the trip mechanism, approaches such trip mechanisms, the plungers of the selector device will raise the fingers 67, 68 and 69 but owing to the different settings of said plungers the slots 73 in the arcuate portions of said fingers will not be in line. The fixed plunger of the selector device will engage the lower end of the lever 62 with the result that the plate 59 will be moved forwardly but owing to the fact that the slots 73 are not in line the edge of the shelf 60 will abut against the edge of at least one of the arcuate portions of the fingers and will not enter the slots so that the plate 59 will not complete its motion and will be positively stopped. Continued movement of the load carrier will merely result in increased angular movement of the lever 62 until the fixed plunger on the selector device passes out of contact with the lower end of said lever. At this point the plate 59, the lever 62 and the fingers 67, 68 and 69 will return to their initial positions. Further motion of the load carrier will result in angular movement of the release lever 78 due to contact of the fixed plunger of the selector device with the lower end of said lever but in this case since the plate 59 has not moved and the plunger 48 is still supported thereby the valve will not be operated and the load carrier will merely pass by the transfer unit and will continue along the main conveyor. As the fixed plunger of the selector device passes out of contact with the lower end of the release lever 76 the latter will be restored to its initial position by virtue of the action of its spring 79.

When trip mechanism of the kind indicated above is to be employed with a transfer unit for effecting transfer of load carriers from the main conveyor to a subsidiary conveyor it will be necessary to incorporate some means which (despite the fact that a load carrier at the transfer point may have an appropriately set selector device for operating the trip mechanism) will prevent operation of said trip mechanism in the event that the conditions on the subsidiary conveyor are such that transfer should not take place e. g. if there is already a load carrier on the subsidiary conveyor in the vicinity of the transfer point. Such means may conveniently comprise a rod or plunger a portion of which is indicated at 80 (Fig. 6), said rod or plunger being adapted, in the event that a load carrier is present on the subsidiary conveyor in the vicinity of the transfer point, to be projected through an aperture in the panel 42 into a position such that on movement of the plate 59 resultant upon actuation of the fingers 67, 68 and 69 by appropriately set plungers of a selector device it (the plunger 80) will be in the path of the plunger 48 and will prevent downward movement of the latter and consequent operation of the valve. The arrangement is such that as soon as the subsidiary conveyor is in a condition to receive the carrier to be transferred the plunger 80 will be retracted thereby to allow downward movement of the plunger 48 and operation of the valve controlling the transfer unit.

As indicated above while the selector gear and trip mechanism have been described in relation to their application to a particular transfer unit associated with a particular type of conveyor it will be appreciated that their use is in no way so limited and that they may be employed to any system wherein a moving part requires to be transferred from one supporting medium to another.

I claim:

1. In a conveyor system wherein load carriers travelling in the conveyor system are provided with selectors each including plunger elements adjustable to provide predetermined combinations of such elements, a trip device for controlling the operation of a mechanism associated with the conveyor, said trip device comprising: a movable member operatively connected to said mechanism, a latch plate capable of limited sliding movement and adapted normally to hold said movable member against movement, and a plurality of movable finger elements disposed in the path of travel of the plunger elements of the selectors so that actuation of the finger elements by a selector results in movement of the latch plate to operate the mechanism.

2. In a conveyor system wherein load carriers travelling in the conveyor system are provided with selectors each including plunger elements adjustable to provide predetermined combinations of such elements, a trip device for controlling the operation of a mechanism associated with the conveyor, said trip device comprising: a movable member operatively connected to said mechanism, a latch plate capable of limited sliding movement and adapted normally to hold said movable member against movement, abutment means projecting from said plate, a pivoted lever carried by said latch plate and adapted to be actuated by load carriers with the predetermined combination to move said latch plate, and a plurality of movable finger elements disposed in the path of travel of the plunger elements of the selectors and each defining a slot, actuation of said finger elements by the predetermined combination of plunger elements causing said slots to be relatively disposed for receiving the abutment means on said latch plate so that on passage of the load carrier past the trip mechanism the lever member is actuated to move the latch plate thereby to bring the abutment means into contact with the appropriately set finger elements which receive the abutment means to permit said latch plate to move and release the movable member.

3. A trip mechanism as claimed in claim 2, resilient means associated with the latch plate to restore the same to its initial position after each actuation.

4. In a trip mechanism as claimed in claim 2, an element adapted to support the movable member and to delay operative movement thereof for a predetermined period after actuation of the latch plate.

5. In a conveyor system wherein load carriers travelling in the conveyor system are provided with selectors each including plunger elements adjustable to provide predetermined combinations of such elements, a trip device for controlling the operation of a mechanism associated with the conveyor, said trip device comprising: a movable member operatively connected to said mechanism, a latch plate capable of limited sliding movement and adapted normally to hold said movable member against movement, abutment means projecting from said plate, a pivoted lever carried by said latch plate and adapted to be actuated by load carriers with the predetermined combination to move said latch plate, a plurality of movable finger elements disposed in the path of travel of the plunger elements of the selectors and each having a slot therein so arranged that on actuation of said finger elements by predetermined combinations of the plunger elements of a selector said slots are brought into line to receive the abutment means on the latch plate thus allowing movement of the latter, and an additional lever element adapted also normally to lie in the path of movement of said movable member and to be actuated by movement of the abutment means to release said movable member thereby to allow operation of the mechanism whereas if said finger elements are not properly actuated movement of the latch plate does not take place and said additional lever element and the movable member remain held by the latch plate.

6. A selector for a load carrier system and adapted for being set in a predetermined condition for keying a triggering mechanism in the system comprising a support for supporting the selector on a load carrier, a roller on said support for positioning said selector with respect to the triggering mechanism, a plurality of cams defining vertically spaced grooves, resilient means, and a frame supporting said cams for adjustable vertical positioning, said resilient means being supported on said frame for selective engagement with the grooves for vertically positioning said cams.

7. A selector as claimed in claim 6 comprising means adapted to cause said resilient means to become disengaged from said grooves.

8. A setting mechanism for use with a selector in a load carrier system wherein the selector includes a plurality of adjustable cams and supporting means for supporting said cams, said setting mechanism comprising means for guiding said selector into determinable position in the load carrier system, means for separating the supporting means from the cams, means for adjusting the position of the cams with the selector in the determinable position, and means for permitting the supporting means to reengage the cams.

References Cited in the file of this patent

UNITED STATES PATENTS

| 2,667,260 | Pyles | Jan. 26, 1954 |
| 2,755,908 | Freeman | July 24, 1956 |

FOREIGN PATENTS

| 396,635 | Great Britain | Aug. 10, 1933 |
| 822,071 | Germany | Nov. 22, 1951 |